AUTOMATIC TELEPHONE ANSWERING AND RECORDING MACHINES

Filed Oct. 3, 1952 4 Sheets-Sheet 1

INVENTOR
JOHN GARFIELD FONTAINE
Ernest E. Carver
ATTORNEY

July 10, 1956 J. G. FONTAINE 2,754,358

AUTOMATIC TELEPHONE ANSWERING AND RECORDING MACHINES

Filed Oct. 3, 1952 4 Sheets-Sheet 2

INVENTOR
JOHN GARFIELD FONTAINE

Ernest F. Carver

ATTORNEY

INVENTOR
JOHN GARFIELD FONTAINE
Ernest L. Carver
ATTORNEY

INVENTOR
JOHN GARFIELD FONTAINE

Ernest E. Carver
ATTORNEY

United States Patent Office 2,754,358

Patented July 10, 1956

2,754,358

AUTOMATIC TELEPHONE ANSWERING AND RECORDING MACHINES

John Garfield Fontaine, Vancouver, British Columbia, Canada, assignor to Automatic Phone Recorder Co. Ltd., Vancouver, British Columbia, Canada Application October 3, 1952, Serial No. 312,925

5 Claims. (Cl. 179—6)

My invention relates to improvements in automatic telephone answering and recording machines, which are particularly adapted for use with electronic recording devices.

The objects of the invention are to provide means whereby the A. C. telephone current which normally rings the telephone is diverted through a master telephone switch when set on "automatic" position, through a coil and condenser installed within the machine, and operates a relay, which in turn closes ratchet relay being connected to A. C. 110 current which activates machine, and answers the calling party and to receive and record the caller's message to be played back to the party called, either through the telephone, a head-set, or aloud if desired. To provide that no other noise within the range of the recorder will set it in motion or interfere with its operation or the use of the caller's phone or the phone called, making it virtually impossible to transmit or record any sounds within the room where the recorder is in operation whilst on "automatic." To provide that the incoming message, or the incoming and outgoing messages, or two way telephone conversations, may be played back to the caller or transmitted by telephone to any other telephone anywhere if desired, or to be telephoned to any other similar recorder. To provide that the instrument directly coupled to the telephone line may be placed in a position remote from its phone, as for instance, in another room, to provide, if desired, to transmit and receive messages without the use of an external telephone. To provide means whereby with the recorder set to "automatic" incoming calls, answering and signalling to caller are attended to without emitting any sounds by the device. To provide means whereby the called party, with his head-set plugged in the earphone jacket, may listen to the message being recorded, if desired. To provide means whereby with the recorder locked or otherwise inaccessible and being set to "automatic," the office phone will be virtually disconnected and incoming messages will be recorded secretly. To provide means through a synchronizing light arrangement for installing outgoing messages, which can be numbered, allowing the owner of the device to call in at any time to determine the number of telephone calls received. To provide means whereby the machine will automatically erase the former messages received when reset, and record subsequent incoming messages without disturbing the previously recorded outgoing messages. To provide governor operated means whereby a power failure in the normal A. C. supply to the recorder during any period when the device is set for automatic operation, will restore the telephone circuit to normal state, so that the telephone will be available for use in the usual way. To provide means whereby the recording machine may be instantly available for use as above stated with the telephone or for use independently for recording and playing back, dictation, or any other desired calls.

Other objects will appear as the specification proceeds.

The invention consists of a telephone call receiving and answering device adapted for use with a telephone service input line, a caller phone and an office phone, comprising an electronic recorder, an internal phone, a master switch connected with the input line of the telephone service and the office phone, a circuit adapted to be selectively closed by the switch to connect the caller phone through said line and the internal phone to the amplifier of the recorder, a second circuit to the internal phone and the caller phone, said master switch being adapted to open and close the normal telephone circuit between the caller phone and the office phone, and mechanically controlled circuits for playing out a message through the internal phone to the caller phone and for recording a message through the internal phone from the caller phone, and also for recording a message from the caller phone and the answer from the office phone on the recorder.

Referring to the accompanying drawings.

In the drawings like characters of reference indicate corresponding parts in each figure.

Figure 1:
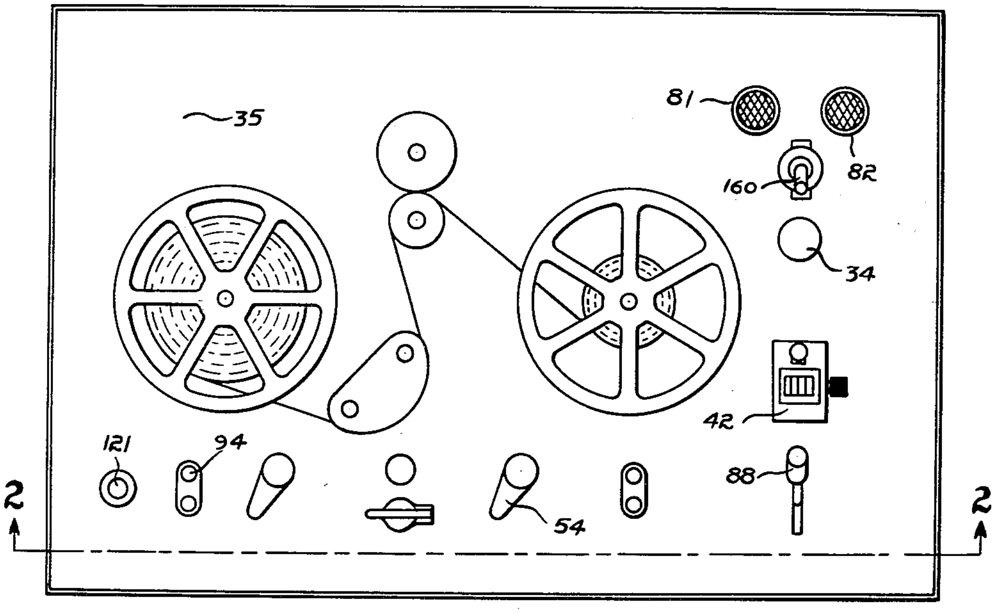
Figure 1 is a plan view of the invention showing the top panel of the tape recorder.

Unless otherwise stated, all switches, switch contacts and other parts of the device are shown as in position when said device is set for "automatic" operation, or in the position for calls to be received by phone and recorded on the tape recorder.

The recorder here shown is a standard tape recorder capable of use for recording dictation or other messages and reproducing or playing out said messages through a speaker and is equipped with a motor, an amplifier, a microphone for dictation and other regular devices.

With this particular tape recorder, the motor shaft 1 drives, through a belt and pulley train 2 indicated in dotted line in Figure 2, a vertical drive shaft 3, which shaft is extended downwardly below the amplifier 5 and its assembled parts. The lower end of the shaft 3 is fitted with a worm 7 meshing with a worm gear 8 to produce a reduction gear 10 to drive a main drive shaft 11 for the machine.

Figure 4:
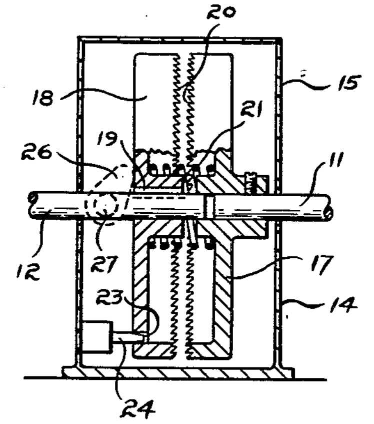
Figure 4 is an enlarged sectional view of the clutch and brake on the drive shaft taken on the line 4—4 of Figure 3 with the clutch disengaged and the brake applied.

Aligned with the main drive shaft 11 is a shaft 12 which is driven from said drive shaft 11 through a clutch 14. The clutch 14, see Figure 4, is enclosed in a housing 15 and consists of a drive clutch member 17 secured to the shaft 11 and a driven clutch member 18 slidably mounted upon the shaft 12 and non-rotatably connected thereto by a key 19. The clutch members are provided with intermeshing saw tooth dogs 20 on their adjacent faces and are resiliently urged apart by a coil spring 21. The clutch member 18 is provided with an aperture 23 into which a brake pin 24, supported upon a wall of the housing 15, enters at the moment that said aperture comes into register therewith following the endwise movement of the clutch member 18 to disengage, so that said member must always stop in exactly the same circumferential position, which, when the device is to operate automatically, is exactly one revolution from starting point. The clutch, when the device is on "automatic," would be engaged so that the shafts 11 and 12 would rotate in unison and in correctly related position. Endwise movement of the clutch member 18 to engage is effecuated by a lever cam 26 shown in dotted line in Figure 4, which cam is secured upon a manually operated shaft 27. The shaft 27 is journalled at its free end in a bearing 28 and is fitted with a lever 30 which is rocked by a vertical push pull rod 31 extending downwardly from a knob 34 through the top panel 35 of the machine, see Figures 1 and 2. The shafts 11 and 12 are adapted to rotate once for each cycle when set to "automatic," that is to say that a call is received, the machine set in motion, a message is played out from the tape to the caller, the caller's message is recorded and the motor is stopped in a position to again receive a call, but current still flows to keep the tubes of the amplifier warm for instant reception.

Mounted upon the shaft 12 is a cam 38 which is adapted to engage one end of an arm 39 which is pivotally mounted in a bearing 40, which arm is connected at its opposite end by a pull wire 41 to a message counter 42 upon the panel 35.

Figure 3:
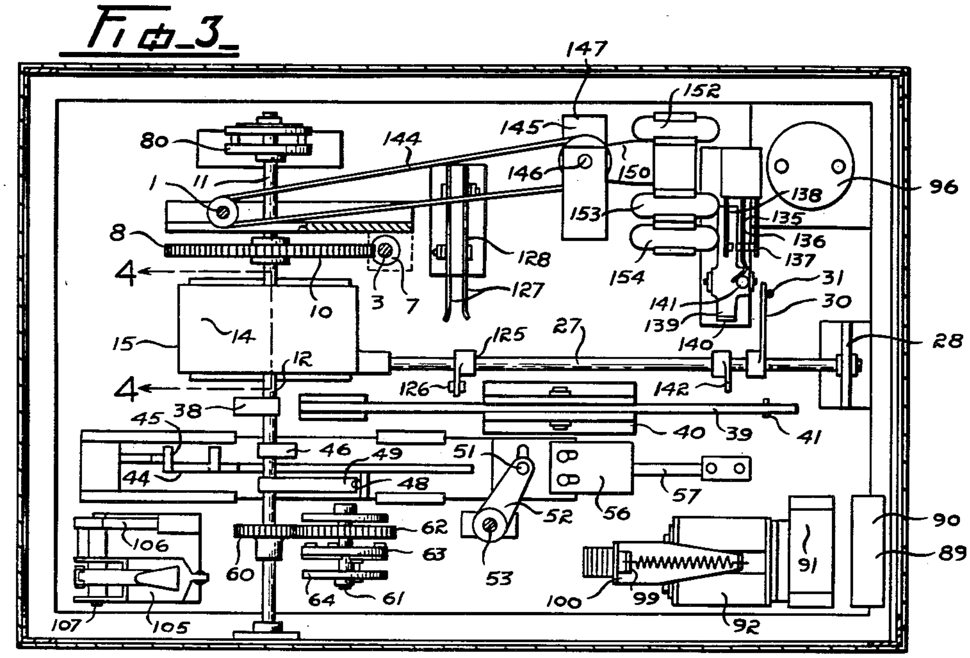
Figure 3 is a sectional plan view taken below the amplifier of the tape recorder on the line 3—3 of Figure 2.
Figure 2:
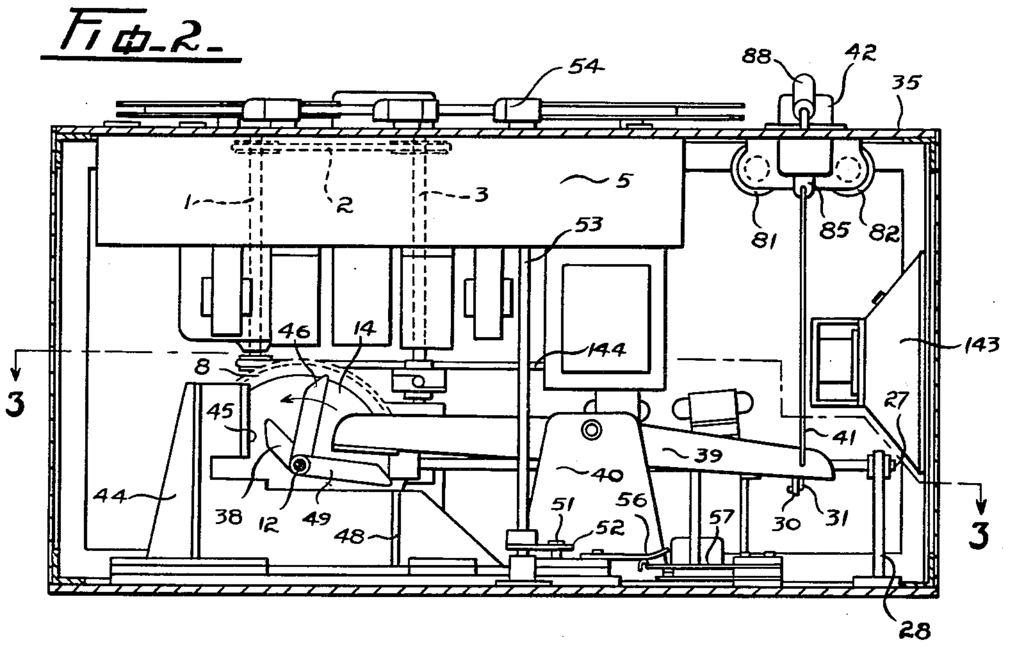
Figure 2 is a longitudinal sectional view taken on the line 2—2 of Figure 1.
Figure 11:
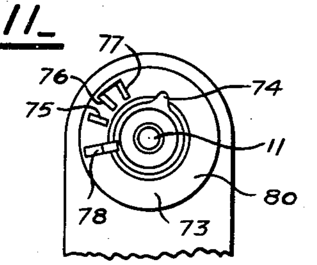
Figure 11 is a detail view of the distributor switch for the synchronizing lights.

Extending longitudinally of the base of the machine is a slide 44 having at one end, as seen in Figures 2 and 3, a thrust plate 45, which plate is adapted to be engaged by a cam 46 secured to the shaft 12 to move the slide to the left. A second thrust plate 48 is mounted intermediate the length of said slide and is adapted to be engaged by a cam 49 which is also secured to the shaft 12 for the purpose of moving the slide to the right. The slide 44 is provided with a pin 51 which is engaged by a lever 52 secured upon a vertical shaft 53 and the shaft is coupled to an aligned shaft, not shown, which extends through the tape recorder and is fitted above the panel 35 with a turn button 54. The turn button 54 is shown set to the left in Figure 1 as when "playing out" from a record and is adapted to be set to the right to "record." Obviously the slide in rocking the vertical shaft will also rock the button 54 except that the slide moving to the right as in Figure 2 will move the button to the left and as the cam 46 moves the slide to the left, it will cause the button to move to the right. At the extreme right of the slide 44 an insulated spring leaf 56 is provided to maintain a switch 57 closed until the slide is fully drawn to the left, as when changing the recorded from "play out" to "erase and record." The spring leaf 56 maintains the switch 57 closed for a short interval after the internal switch of the recorder is set to receive a message for recording. The interval above described may be altered by adjusting the overhang of the spring leaf 56 beyond the end of the slide 44.

Figure 10:
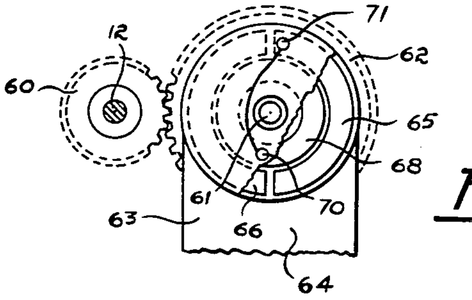
Figure 10 is a detail elevational view of the arcuate contact switch.

Secured upon the forward end of the shaft 12 is a pinion 60 which drives a half time shaft 61 through a gear 62. The shaft 61 extends through a selector 63 having an insulated vertical plate 64, see Figure 10, on which a pair of arcuate contacts 65 and 66 are concentrically mounted as is an annular contact 68. On the shaft 61 in front of the plate 64 a pair of bridged contacts 70 and 71 are carried. The contact 70 making continuous contact with the annular contact 68 and the contact 71 making contact alternately with the contacts 65 and 66. It will be obvious that the switch formed by the above described mechanism will be closed alternately to one arcuate contact or the other during each complete revolution of the shaft 12 and since it is connected within the motor circuit, it will stop the motor as soon as the contact 71 moves from one arcuate contact onto the other.

Secured upon the shaft 11 is an insulated contact ring 73 having a projection 74 which is adapted to progressively engage radially disposed contacts 75, 76 and 77 carried upon an insulated plate surrounding the shaft 11. The contact ring 73 is under constant engagement by a contact 78, thus forming a rotary switch 80 which is connected in a circuit controlling synchronizing lights 81 and 82, and which are visible through the panel 35 of the recorder.

Figure 13:
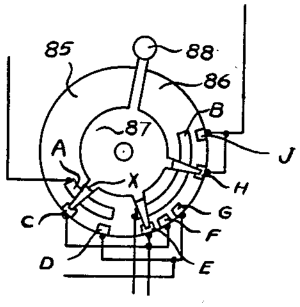
Figure 13 is a similar view of said switch set with the office phone connected with the recorder to record incoming and outgoing messages.
Figure 12:
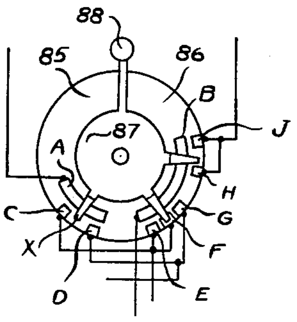
Figure 12 is a face view of the telephone master switch set to leave the internal phone disconnected from the recorder.
Figure 14:
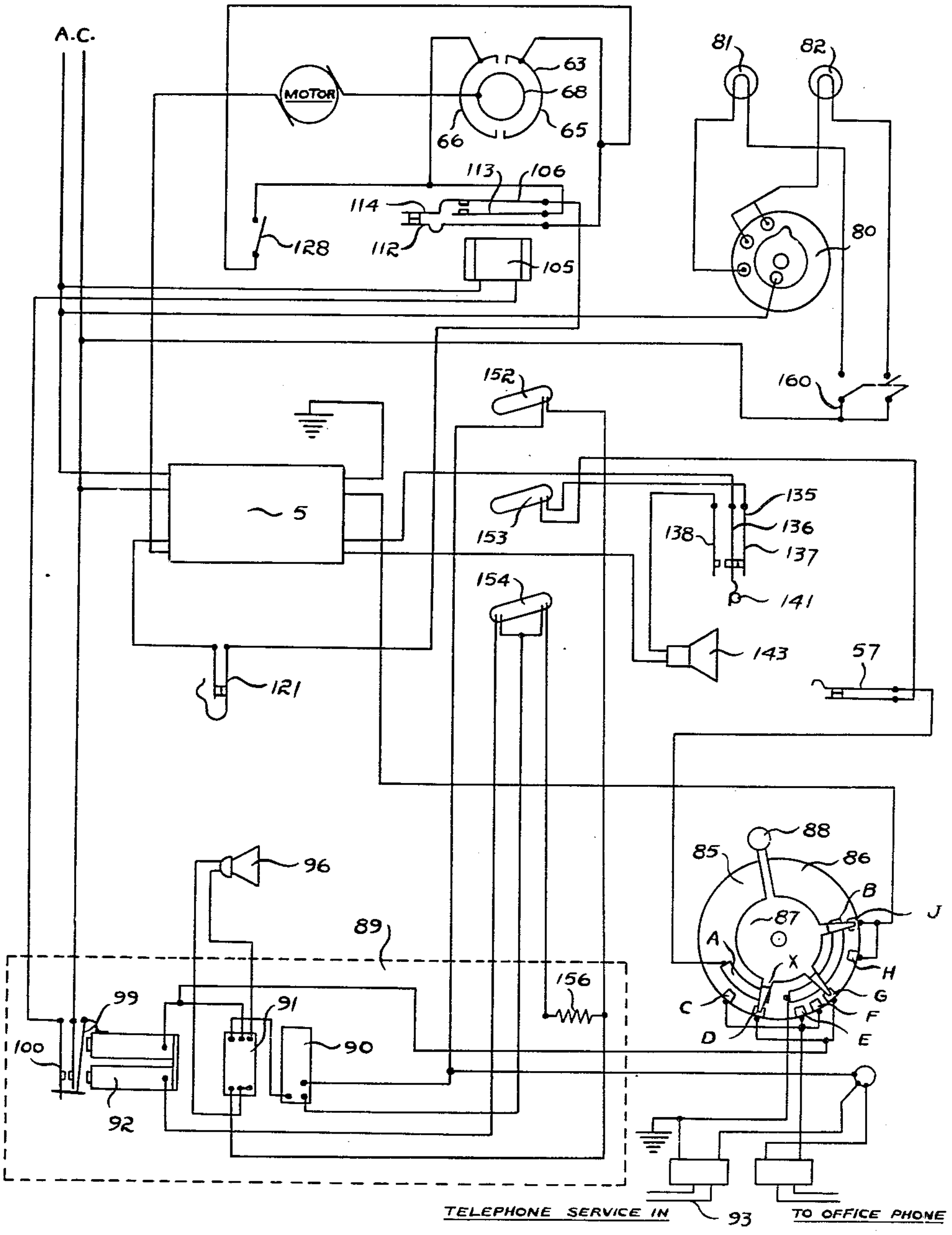
Figure 14 is a wiring diagram of the circuits between the telephone service wires, the power service wires and the amplifier with the master switch set to "automatic" ready to answer and receive an incoming call.

The numeral 85 indicates the master or main switch which is shown in the diagram in Figure 14 in "automatic" position, in Figure 13 it is shown in position with the office phone connected with the recorder, and in Figure 12 it is shown with the office phone normally connected to the line for regular use and the recorder set for its use in recording dictation and playing out for transcribing. The switch 85 consists of a circular base 86 carrying inner contact segments A and B and outer contacts C, D, E, F, G, H and J, which are selectively bridged by radial contact fingers X extending from a centrally mounted disk 87 having an operating knob 88 which extends above the panel 35.

Mounted on the base of the machine is an internal phone 89 which includes the components of a telephone wall box or the base of a conventional telephone. These components consist of a condenser 90, a coil 91 and a bell magnet 92 minus its clapper and bells, said bell magnet forming a relay, all of which are connected through the main switch and to the input wires 93, see Figure 14, from the telephone exchange in the same manner as they are connected to the components of the telephone adjacent the set, consequently any signal or message from a caller phone to the recording device, or message out from the device to caller phone will be directly transmitted through the telephone service line and not through the office telephone when the device is set to automatic operation, or when the office telephone is not being used in the conversation.

The recorder is provided with a detachable microphone, not shown, which is adapted for connection to a jack 94 accessible through the panel 35.

A standard receiver 96, minus the ferrotype plate forms part of the internal phone 89 and is connected directly across the coil 91 in parallel with the office phone, so that a message may be picked up from a caller's phone by the recorder even though the office phone, viz. and receiver or handset transmitter, is resting upon its base. Since the receiver 96 is not provided with a ferrotype plate, the message will be by electrical impulse alone and no noise will issue therefrom, neither will any noise in the vicinity of the instrument influence the incoming impulses.

Figure 8:
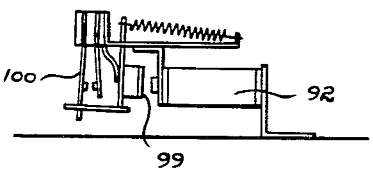
Figure 8 is a side elevational view of the built in bell relay.

The bell magnet 92, see Figure 8, is equipped with an armature 99 which is adapted to close a switch 100 each time the bell emits its normal call signal, such as three one second rings at one second intervals in response to a call from an outside phone. The components of the internal phone, viz: the condenser 90, coil 91, bell magnet 92 and receiver are all connected in parallel with those of the office phone to perform the same functions and are selectively controlled by the master switch 85, so that when desired all signals received from the telephone exchange, or the caller phone, can be by-passed completely from the office phone to the recording device, leaving the office phone disconnected.

Figure 9:
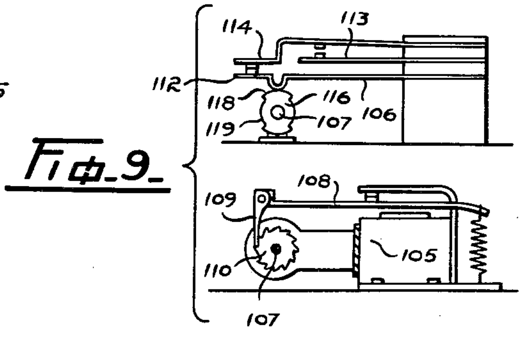
Figure 9 is a side elevational view of the delayed action relay in the motor circuit.

The delayed action relay shown in Figure 9 consists of a relay 105 and a three contact switch 106 coupled together by a shaft 107. The relay has a coil connected in the A. C. circuit leading to the switch 100 and has a spring tensioned armature 108 provided with a pawl 109 engaging a twelve toothed ratchet wheel 110 mounted upon the shaft 107. The switch 106 consists of three parallel spring leaf contacts 112, 113 and 114. The contact 112 is adapted to be moved by a cam 116 secured upon the shaft 107 and having two high points and two low points 118 and 119 upon its periphery which are progressively adapted to engage the spring leaf 112 following three bell rings or three impulses energizing the bell magnet to alternately close the contacts 112 and 114 and the contacts 112 and 113. The leaf contact 112 is connected through to the arcuate contact 65 on the plate 64, see Figures 10 and 14; the leaf contact 113 is connected through to the arcuate contact 66, and the leaf contact 114 is connected to the amplifier in the A. C. motor circuit, which circuit is completed from the annular contact 68 through the motor and back to the amplifier. A normally closed switch 121 is included in the motor circuit which is part of the recorder and is adapted to be opened manually when desiring to stop the motor when transcribing from the record.

Figure 6:
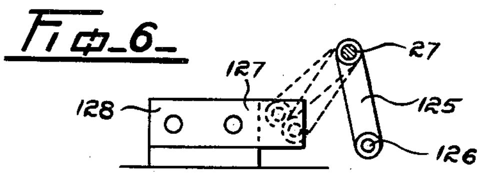
Figure 6 is a side elevational view of a switch in the motor circuit.

Mounted upon the manually operated shaft 27, see Figure 6, is a radially operated arm 125 through the free end of which an insulated contact 126 extends. This contact combines with a pair of spaced leaf contacts 127 having flared ends, which contacts constitute a normally open switch 128. The switch 128 is included in a bypass between the arcuate contacts 65 and 66 and is open when the knob 34 is depressed to move the arm 125 from either of the dotted line positions to the solid line position shown in Figure 6.

Figure 5:
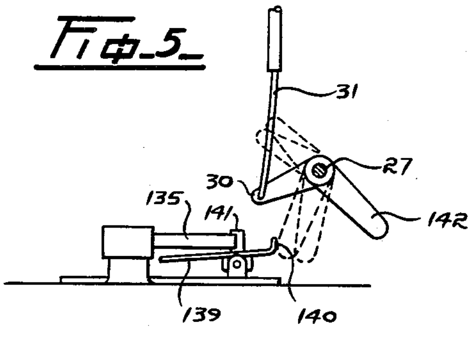
Figure 5 is a side elevational view of a switch in the speaker circuit.

The numeral 135, see Figures 3, 5 and 14, indicates a triple switch having leaves 136, 137 and 138 in which the leaves 136 and 137 are normally contacting each other. A rocker 139 is mounted adjacent the free end of the leaves and is provided with an upturned end 140 and a pin 141. The end 140 is adapted to be engaged by an arm 142 which is secured upon the manually operated shaft 27 to move the pin 141 into engagement with the free end of the leaf 136, so as to break contact with the leaf 137 and make contact with the leaf 138. When the switch 135 is closed as between leaves 136 and 138 it closes the direct circuit from the amplifier to the recorder speaker 143 and when closed as between leaves 136 and 137 as shown in Figure 14, it closes the circuit of the internal phone 89 which connects up with the input from the telephone exchange through the main switch 85 when said switch is in the position shown in Figure 14, leaving the office phone disconnected.

Figure 7:
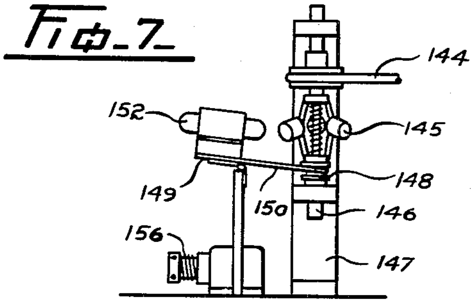
Figure 7 is an elevational view of the governor control of the mercury switches with the governor at rest.

Driven from the motor shaft 1 by a belt 144 is a flyball governor 145 which is freely journalled upon a shaft 146 supported by a frame 147. The governor is provided with a vertically slidable grooved collar 148 which is adapted to rise as the motor starts. A hingedly supported table 149 is supported close to the frame 147 and is provided with a forked arm 150 which engages the groove of the collar 148. Fixedly supported upon the table 149 are three mercury switches 152, 153 and 154, all of which are shown tilted in Figure 7 and in Figure 14, as when the device is ready to start.

A resistor 156 forms part of the internal phone 89 and performs its usual function when the switch 154 is tilted and the motor is running and the device is ready to transmit to and receive a message from a caller. This resistor serves the same purpose relative to the internal phone as the inbuilt resistor included in the regular telephone instrument or its call box.

When the device is to be set to receive and record incoming calls after giving a message to the caller, the master switch 85 is set in the position shown in Figure 14 and the knob 34 is fully depressed, setting the clutch members 17 and 18 to engage the shafts 11 and 12, so that the shaft 12 may be driven to perform its several mechanical functions and leaving the switch 128 in the motor circuit open and the switch 135 closed to the leaves 136 and 137, with the internal phone connected to the amplifier. As soon as a signal is received through the master switch 85 from the caller's phone, the bell magnets 92 close the points on the switch 100, thus closing the A. C. circuit to the coil of the relay 105, which actuates the delayed action relay switch 106 to switch the current from the amplifier through contacts 112 and 114, through arcuate contact 67 to motor to start it. As soon as the motor starts, the governor 145 tilts the mercury switches 152, 153 and 154. The switch 152 serves the same purpose with regard to the internal phone as the switch button or receiver arm on an ordinary telephone in closing the speaking circuit in the phone and the tilting of the switch 154 breaks the ringing circuit and closes the circuit through the phone resistor 156. At this time the receiver or microphone of the internal phone is connected to the caller's phone, so that it can transmit the message from the recorder which is now set to "play out." As the message is being transmitted from the amplifier to the receiver of the internal phone, the cam 46 is moving towards the slide 44 to move it to the left and to switch the recorder, through the vertical shaft 53, to "record" which completes the circuit from the internal phone to the amplifier, so that the message is received from the caller's phone by the inbuilt microphone of the recorder. At this time the speaker circuit is still connected with the amplifier and the internal phone, so that during the changeover from "play out" to "record," line and amplifier currents are creating a feedback which results in oscillation in the speaker 143 which is audible to the caller through the receiver or microphone 96 of the internal phone and is made use of as indicating to the caller that at its termination he should speak his message. The switch 57 in the speaker circuit is held in normally closed position by the leaf 56 which, being carried by the slide 44, slides off the upper contact of said switch at a predetermined interval and as the changeover from "play out" to "record" is completed. Obviously the opening of the speaker circuit will stop the oscillation, so that the caller's message can be recorded. Since the clutch elements 17 and 18 must always engage in the same relative position, the operation of the rotary switch 80 must always, when in "automatic" position synchronize with the rotation of the driven shaft 12 and its cooperating parts.

The lights 81 and 82 are preferably red and green respectively and are on A. C. circuits controlled by a manually operated double pole single throw switch 160. The primary purpose of the synchronizing lights is for the convenience of the owner in recording messages on a tape at predetermined intervals of its length which will serve to answer each incoming telephone call when the recorder is set to play out only. With the tape running in the normal way and the switch 160 closed, the user waits until the red light comes on, which will indicate that it is at the beginning of a cycle and close to time for him to speak his message, as soon as the green light comes on the message is given and must be completed before the green light goes off.

At the end of the message receiving cycle the cam 49 moves the slide 44 to the right to switch the amplifier back to "play out" position and the motor circuit will be broken at the arcuate contact 66 which will allow the motor to come to rest and restore the mercury switches 152, 153 and 154 to the position shown in Figure 14. The inertia of the motor after the circuit is broken is such as to carry the contact 71 onto the arcuate contact 66, leaving the switch 106 open to that side of the selector 63, which switch will be operated on the next incoming signal from a caller phone as previously described.

If it is desired to record both incoming and outgoing messages, the master switch 85 is set with its knob 88 to the right as in Figure 13. The line is then connected to the office phone through switch contacts B–E back to the office telephone outlet box as shown in Figure 14 and through to the amplifier. In this case, the office phone and the caller's phone are both connected through the amplifier.

It will be noticed that when on "automatic" as between the caller's phone and the amplifier for answering the call and recording the caller's message, a change can be made whereby both the caller's message and the office phone message may be instantly made by moving the knob 88 from the position shown in Figure 14 to the right, or to the position shown in Figure 13. The change effected by this master switch movement couples the office phone with the amplifier without disturbing the hook up between the caller's phone and the amplifier.

To record a message from a caller which is longer than normal and when the owner of the office phone is present, the master switch should be in the position shown in Figure 14 and the owner will raise the button 34 to an intermediate point to disconnect the clutch elements 17 and 18, which will leave the selector 63 at rest and close switch 128, so that the motor will continue to run and the incoming message will be recorded. If the switch setting is as in Figure 13 the owner's phone message will also be recorded. To reset the device after a prolonged message, the button is again depressed to bring the mechanical drive into operation which will continue to the end of a normal cycle, stopping the motor and leaving the device ready to receive a new bell magnet signal from outside.

At the end of each cycle, whether recording normal messages to an absentee owner, the walking beam 39 will be tilted by the cam 38 to trip the counter 42 and show the number of messages recorded since said counter was last set to zero, or normally the number of outside calls received during the absence of the owner from the office.

When it is desired to use the device for recording dictation and for playing out to a stenographer, the master switch 85 is set with the knob 88 in a vertical position which disconnects the line, the office phone and the internal phone from the amplifier. The knob 34 needs to be raised to its uppermost position, leaving the clutch members 17 and 18 disengaged and closing the triple switch 135 as between leaves 136 and 138 and completing the direct circuit from amplifier to speaker 143. The raising of the knob 34 to uppermost position also closes the contacts 127 of the switch 128, so that the motor circuit from the amplifier is through contacts 114 and 113 of the switch 106 through switch 128, thence through the arcuate contact 65 to motor and back to amplifier or, from amplifier through contacts 113 and 112 of the switch 106, through switch 128 and arcuate contact 66 to motor and back to amplifier. When the master switch and knob 34 are set as above, the office phone is connected to the telephone service line 93 only and is set for normal use independent of the recorder and the recorder can be controlled, or its motor started or stopped by simply moving the knob to uppermost or intermediate position.

What I claim as my invention is:

1. A telephone answering and recording device comprising an electronic recorder operated from a power line and having an amplifier, an impulse pickup, a microphone, a speaker and circuits therefor, an internal telephone, said recorder having means for receiving and recording messages, and means for playing out the messages so received, said internal telephone having the components of a telephone call box such as a condenser, a coil and an electromagnet and a receiver, said components being adapted for connection to a telephone service line and a circuit from the internal telephone line to the amplifier including a master switch, a circuit having alternate paths for the motor of the recorder, said motor circuit having a rotary switch to alternately close one circuit path and open another, a relay actuated by the electromagnet of the internal phone for closing the motor circuit in response to a signal received from the telephone service line, mechanically operated switches for changing the recorder from playing out to recording, said rotary switch having arcuate contacts and a rotating pointer operated by the motor to engage and traverse one arcuate contact and to break the circuit path through said contact as the pointer swings to the other of said contacts to stop said motor.

2. A telephone answering and recording device as claimed in claim 1, wherein the circuit from the telephone service line to the magnet of the internal phone includes a normally open switch and the amplifier to speaker circuit includes a normally open switch, both of said switches being actuated by the motor to open the closed switch to the magnet and close the open switch to the speaker.

3. A telephone answering and recording device as claimed in claim 1, wherein a normally closed switch is included in the motor circuit which is adapted to be tipped by an operating train from the motor to open said switch and manually controlled means are provided for immobilizing the switch tipping means whereby to leave the motor running beyond a normal predetermined running period and to continue the recording of the message.

4. A telephone answering and recording device as claimed in claim 1, wherein the actuating means for the relay in the motor circuit is a second relay in which the electromagnet of the internal phone forms the coil of said second relay, said second relay having an armature and a pair of normally open contacts, said contacts being in a circuit leading to the coil of the first mentioned relay.

5. A telephone answering and recording device as claimed in claim 1, wherein the actuating means for the relay in the motor circuit is a second relay in which the electromagnet of the internal phone forms the coil of said second relay, said second relay having an armature and a pair of normally open contacts, said contacts being in a circuit leading to the coil of the first mentioned relay, said first mentioned relay being adapted to close the motor circuit after the armature of the second relay has been attracted to the electromagnet in response to at least two successive closely spaced telephone call signals from the telephone service line.

References Cited in the file of this patent

UNITED STATES PATENTS

| | | |
|---|---|---|
| 2,080,812 | Fairbanks | May 18, 1937 |
| 2,261,420 | Shively et al. | Nov. 4, 1941 |
| 2,284,173 | Soukup et al. | May 26, 1942 |
| 2,393,272 | Van Deventer | Jan. 22, 1946 |
| 2,533,234 | Edwards | Dec. 12, 1950 |
| 2,673,241 | Van Deventer et al. | Mar. 23, 1954 |
| 2,673,242 | Van Deventer | Mar. 23, 1954 |